US009313328B2

(12) United States Patent
Vendrow et al.

(10) Patent No.: US 9,313,328 B2
(45) Date of Patent: Apr. 12, 2016

(54) ACTIVE CALL PROCESSING AND NOTIFICATIONS

(75) Inventors: Vlad Vendrow, Redwood City, CA (US); Bruce Young, San Jose, CA (US)

(73) Assignee: RingCentral, Inc., Belmont, CA (US)

( * ) Notice: Subject to any disclaimer, the term of this patent is extended or adjusted under 35 U.S.C. 154(b) by 1392 days.

(21) Appl. No.: 12/234,596

(22) Filed: Sep. 19, 2008

(65) Prior Publication Data

US 2009/0086950 A1 Apr. 2, 2009

Related U.S. Application Data

(60) Provisional application No. 60/995,835, filed on Sep. 28, 2007.

(51) Int. Cl.
*H04M 3/493* (2006.01)

(52) U.S. Cl.
CPC .................................. *H04M 3/493* (2013.01)

(58) Field of Classification Search
CPC ..... H04M 3/523; H04M 3/51; H04M 3/5232; H04M 3/5158
USPC ........................................ 379/265.01, 266.02
See application file for complete search history.

(56) References Cited

U.S. PATENT DOCUMENTS

| | | | |
|---|---|---|---|
| 5,608,788 A * | 3/1997 | Demlow et al. | 379/142.07 |
| 5,712,712 A | 1/1998 | Sayward | |
| 6,230,024 B1 | 5/2001 | Wang et al. | |
| 6,901,139 B2 | 5/2005 | Gonzalez et al. | |
| 7,180,638 B1 | 2/2007 | Hou et al. | |
| 8,401,163 B1 * | 3/2013 | Kirchhoff et al. | 379/201.01 |
| 2002/0194331 A1 * | 12/2002 | Lewis et al. | 709/224 |
| 2004/0218748 A1 | 11/2004 | Fisher | |
| 2005/0153739 A1 | 7/2005 | Halsell | |
| 2005/0201533 A1 | 9/2005 | Emam et al. | |
| 2006/0253895 A1 | 11/2006 | Brandofino et al. | |
| 2008/0151874 A1 | 6/2008 | Wynn | |
| 2008/0207166 A1 | 8/2008 | Aerrabotu et al. | |
| 2008/0240376 A1 * | 10/2008 | Conway et al. | 379/88.03 |
| 2009/0141875 A1 | 6/2009 | Demmitt et al. | |
| 2011/0207437 A1 * | 8/2011 | Richardson et al. | 455/413 |
| 2014/0093058 A1 | 4/2014 | Larson | |

OTHER PUBLICATIONS

Copenheaver, Blaine R.; Notification of the Transmittal of the International Search Report and Written Opinion of the International Searching Authority, or the Declaration; International Application No. PCT/US2008/077546; Date of Mailing Dec. 8, 2008; Form PCT/ISA/220 (1 page); Form PCT/ISA/210 (2 pages); Form PCT/ISA/237 (5 pages).

(Continued)

*Primary Examiner* — Oleg Asanbayev
(74) *Attorney, Agent, or Firm* — Finnegan, Henderson, Farabow, Garrett & Dunner LLP

(57) ABSTRACT

Embodiments of the invention relate generally to computing devices and systems, as well as software, computer programs, applications, and user interfaces, and more particularly, to processing active calls and stored calls in a communication network for packetized and/or synchronous communications, and to generating notifications relating to active calls and stored calls. Other embodiments relate to creating and implementing bypass rules that allow a party to bypass a set of default prompts to a the party's communication device while enabling the caller device to access functions of a call processing system.

14 Claims, 10 Drawing Sheets

(56) References Cited

OTHER PUBLICATIONS

Copenheaver, Blaine R.; Notification of the Transmittal of the International Search Report and Written Opinion of the International Searching Authority, or the Declaration; International Application No. PCT/US2008/077683; Date of Mailing Dec. 10, 2008; Form PCT/ISA/220 (1 page); Form PCT/ISA/210 (2 pages); Form PCT/ISA/237 (6 pages).

* cited by examiner

500 ─┐           502
         ┌────────────────────────────────────────────────┐
         │  Format of notification emails:  [HTML ▼]   [ Switch to Standard ] │
    510 ─┤  ┌─ Voice Messages ──────────────────────────┐ │
         │  │  Email    510a →  [ Send notification with attachment ]      │
         │  │          510b →  ☐ Delete message when emailed              │
         │  │  Send to:  510c →  [ name@address.com ]                     │
         │  │  Text Messaging   [ Disabled ▼ ]                             │
         │  │  Send to:  510d →  [ person@address.com ]  Add mobile phone │
    512 ─┤   Urgent Priority ☐   Use the same settings as Normal Priority │
         │  ┌─ FAX Messages ────────────────────────────┐ │
         │  │  Email           [ Send notification with attachment ▼ ]    │
         │  │                    Do Not Send Notification                 │
         │  │  Send to:          Send Notification Only                   │
         │  │  Text Messaging   [ Disabled ▼ ]                             │
    514 ─┤  │  Send to:         [                         ]                │
         │  ┌─ Incoming Calls ──────────────────────────┐ │
         │  │  Email    514a →  [ Do Not Send Notification ▼ ]             │
         │  │          514e →  ☐ Unless the caller leaves a voicemail     │
         │  │          514f →  ☐ Unless I've answered the call            │
         │  │  Send to: 514b →  [ name@address.com ]                       │
         │  │  Text Messaging   [ Disabled ▼ ]  ← 514c                    │
         │  │          514g →  ☐ Unless the caller leaves a voicemail     │
         │  │          514h →  ☐ Unless I've answered the call            │
    516 ─┤  │  Send to: 514d →  [                      ]  Add mobile phone│
         │  ┌─ Outbound FAX Confirmations ──────────────┐ │
         │  │  Email            [ Send email confirmations ▼ ]             │
         │  │  Text Messaging   [ Disabled ]                               │
         │                      [ Submit ]                                 │
         └────────────────────────────────────────────────┘

FIG.5

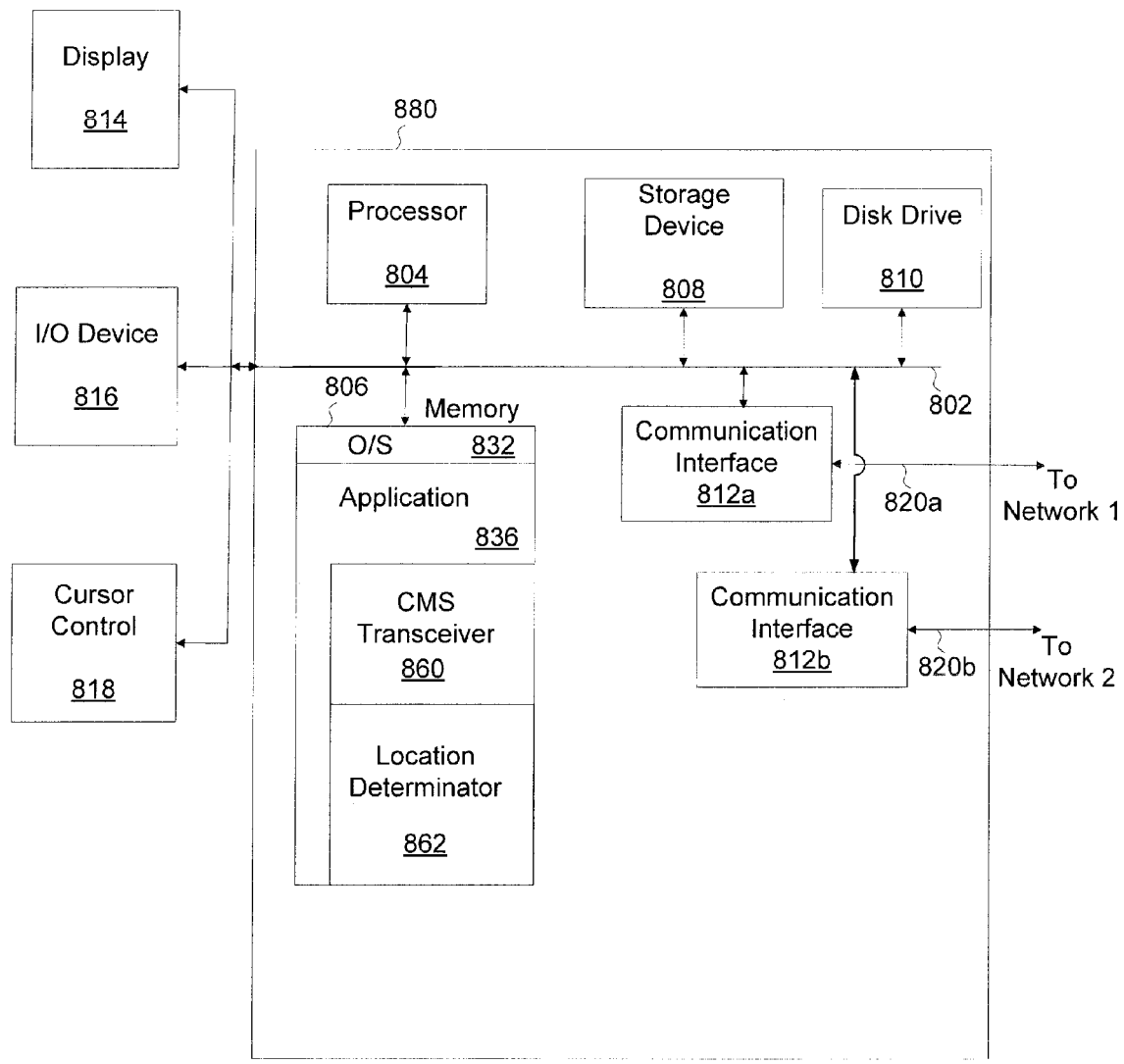
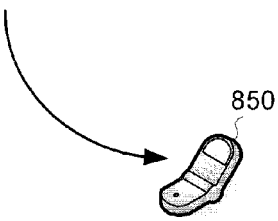
FIG. 8B

ACTIVE CALL PROCESSING AND NOTIFICATIONS

CROSS REFERENCE TO RELATED APPLICATIONS

This application claims the benefit U.S. Provisional Application No. 60/995,835, entitled "ACTIVE CALL PROCESSING AND NOTIFICATIONS" and filed on Sep. 28, 2007, which is herein incorporated by reference for all purposes.

FIELD OF THE INVENTION

Embodiments of the invention relate generally to computing devices and systems, as well as software, computer programs, applications, and user interfaces, and more particularly, to processing active calls in relation to a communication network for packetized and/or synchronous communications, and to generating notifications relating to at least active calls.

BACKGROUND OF THE INVENTION

While traditional techniques for processing electronic messages and calls are functional, there are certain drawbacks to these techniques. For example, callers in emergency situations, or otherwise placing a priority call that merits special treatment, may be faced with obstacles to completing their calls, such as default system rules and/or customized rules for call handling and routing. These rules may require the caller, for example, to respond to prompts that delay connecting the call. Alternatively, or additionally, such rules may route the call in a manner that delays its completion with the desired person or device. Moreover, once a call is placed, the call may not be completed for a variety of reasons. It may be advantageous to maintain the incomplete call as active so that it can be completed subsequently by the intended callee more efficaciously than if the caller were to have to make the call again.

It would be desirable to provide computing devices and systems, as well as software, computer programs, applications, and user interfaces that minimize one or more of the drawbacks associated with the conventional techniques for processing calls in communication network for packetized and/or synchronous communications. In particular, it would be advantageous to have technology that allows a caller to bypass default and/or customized rules for call handling in order to avoid the resultant delay in connecting the call. It further would be advantageous to have technology that allows holding an active call in waiting to allow the original called party to respond to the caller, rather than having the calling system drop the incomplete call and require the caller to re-dial.

BRIEF DESCRIPTION OF THE FIGURES

The invention and its various embodiments are more fully appreciated in connection with the following detailed description taken in conjunction with the accompanying drawings, in which:

FIG. 5 is a diagram showing an example of an interface that can be implemented to configure the processing of calls, according to at least one embodiment of the invention;

FIG. 8B illustrates another exemplary computer system suitable for process active calls and generate notifications, according to at least one embodiment of the invention.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
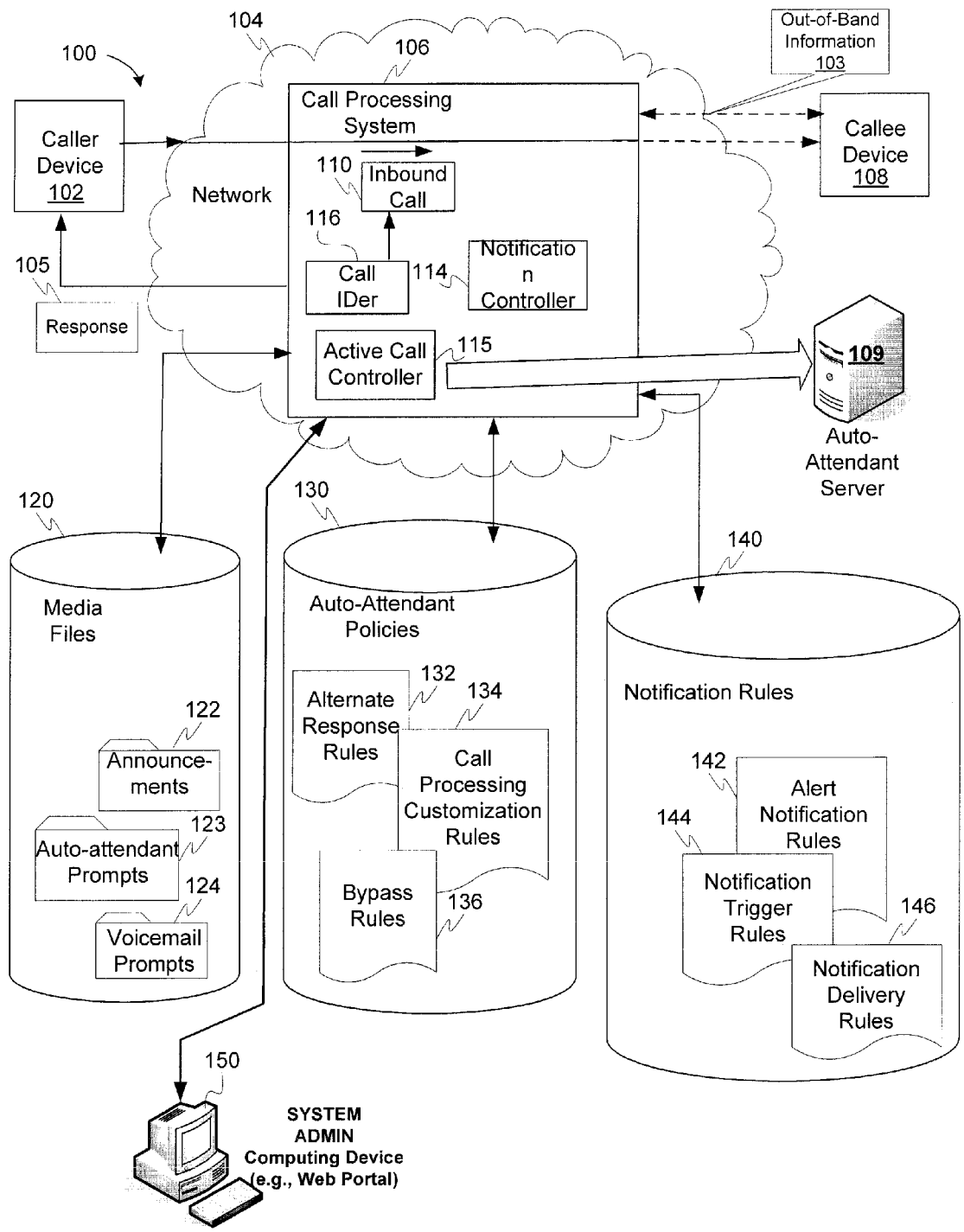
FIG. 1 is a diagram of a call processing system, according to at least one embodiment of the invention.

FIG. 1 is a diagram 100 of a call processing system, according to at least one embodiment of the invention. As shown, a call processing system 106 is configured to analyze at least inbound calls, such as inbound call 110, that originate at a caller device 102 and traverse via network 104 to a callee device 108. Call processing system 106 includes a call identifier ("Call IDer") 116, an active call controller 115, and a notification controller 114. Call identifier 116 can be configured to determine a number of call attributes of inbound call 110, including the identity of caller device 102. Call processing system 106 can be configured to provide out-of-band information 103 during active calls to callee 108, the out-of-band information 103 including, for example, notifications and/or menu options regarding a call from caller 102. In one embodiment, out-of-band information 103 can be sent to callee device 108 as a function of the presence of either the callee or callee device 108. Call processing system 106 can also be configured to provide a response 105, which can be customized as function of, for example, the identity of caller device 102. As such, response 105 can be a menu presenting selections that are tailored for caller device 102. Caller device 102 and callee device 108 can be any type of communication endpoint, such as an analog (PSTN) telephone, an internet protocol ("IP") (e.g., VoIP) phone, an email address, a pager, a symmetric messaging service destination address, or some other alert mechanism (e.g., a pager). In at least one embodiment, active call controller 115 can be implemented as an auto-attendant server 109.

Active call controller 115 can be configured to control aspects of inbound call 110 as an active call. The term "active call" can refer, at least in one embodiment, to any call that is in progress (i.e., at least caller device 102 has initiated the call). For example, active call controller 115 can provide caller device 102 with an announcement regarding the status of the call (e.g., the caller is being recorded), as well as selections provided by, for example, an active call controller 115. Such a selection can be provided in a menu-like format, either audibly or visually. Notification controller 114 can be configured to identify triggering events that can generate a notification, and to deliver the notification in a variety of ways.

Call processing system 106 is coupled to a repository ("media files") 120 that is configured to store media files, a repository ("auto-attendant policies") 130 that is configured to maintain sets of rules to modify either the behavior of active call controller 115 operating—at least in part—as auto-attendant server 109, or the selections provided by active call controller 115 in a menu format (e.g., to present a selection that provides for an option that enables, if selected, a caller to receive information via an electronic facsimile), or both. Call processing system 106 is also shown to be coupled to a repository ("notification rules") 140 configured to maintain sets of rules to modify the triggering events that generate a notification, and to select a mode of delivery for the notification.

Repository 120 is shown to include an announcement media file 122, an auto-attendant prompts media file 123, and a voicemail prompts media file 124. Active call controller 115 can interact with announcement media file 122 to, for example, play an announcement to one or more participating endpoints, such as caller 102, when call recording or any other call processing functions are enabled or disabled. In one embodiment, active call controller 115 can include the functionality of a media server (or a portion thereof). The announcements can be directed to one or more participating endpoints, and can explain how to enable or disable features. In at least one embodiment, active call controller 115 can be configured to record active calls for later review for security and performance improvement reasons, for instance. A system administrator at computing device 150 or a user at callee device 108 can enable or disable call recording using any input device, including a web portal, a softphone client, any other client application, text messaging, or dual-tone multi-frequency ("DTMF") inputs into a phone, the DTMF commonly being known as keypad dial-tones. In one embodiment, call processing system 106 can accept an authorization code, that, if verified against provisioned allowed authorization codes (or PINs), can enable (or disable) call recording from any endpoint (e.g., at callee device 108). Optionally, call recording can be implemented without the knowledge of the other participating call endpoints (e.g., caller device 102). Call processing system 106 can detect DTMF sounds that constitute an authorization code. Active call controller 115 can implement an auto-attendant (e.g., server 109) to provide one or more menus having auto-attendant prompts from media file 123 that provide audio or visual selections for soliciting inputs from, for example, caller device 102. Further, active call controller 115 can implement voicemail prompts media file 124 to manage the handling of voice messages.

In various embodiments, active call controller 115 can be implemented as, or in connection with, auto-attendant server 109. As such, active call controller 115 can use auto-attendant policies in repository 130 to process calls. Repository 130 is shown to include alternate response rules 132, call processing customization rules 134, and bypass rules 136. Active call controller 115 can provide auto-attendant options in a menu format so that caller device 102 can be presented with an option to receive an electronic facsimile ("fax") that describes call processing options or any other information. As such, active call controller 115 can use rules 132 that define an alternate delivery mode by which to send response 105 to complete a request for information by caller device 102. For example, caller device 102 can elect to receive a reply via fax. As such, a menu option can prompt caller device 102 to select one of a number of company promotions. In one embodiment, if caller device 102 selects this menu option, then call processing system 106 can verify the caller ID, and, optionally, prompt caller device 102 to provide an authorization code (e.g., a personal identification number (PIN)). If call processing system 106 validates the caller identification, then call processing system 106 can prompt for caller device 102 to select one of a number of delivery modes, which can include an electronic facsimile. Thus, caller device 102 can provide a fax number, an email name, an audio telephone number, or a unified messaging box for receiving response 105.

In one embodiment, active call controller 115 can be configured to modify calling rules in accordance with a rule set 134 in repository 130. For example, active call controller 115 can cooperate with rule set 134 to enable active call controller 115 to generate an auto-attendant menu for presentation at caller device 102, whereby the presentation of the auto-attendant menu can be customized to include a specific subset of selections. Note that the customization of an auto-attendant menu can be a function of the identity of caller device 102. And the selections of the auto-attendant menu can modify how call processing system 106 handles missed calls, call logs, and access to account settings. In turn, active call controller 115 can facilitate (1) editing of routing rules, (2) making a call with a new caller ID, (3) calling out from another location, among other things. In one embodiment, the menu can prompt for and verify a caller PIN password (or any other caller identification) before granting access to the calling rules. In one instance, active call controller 115 can present a subset of menu selections as a function of a recognized inbound caller ID, PIN or other caller identification.

In at least one embodiment, active call controller 115 can be configured to bypass, or override, a set of default prompts that active call controller 115 might otherwise provide by way of auto-attendant menus, or by way of voice mail access menus, or the like. In operation, active call controller 115 can access bypass rules 136 in repository 130 to determine when to bypass the set of default prompts. To illustrate, consider that call processing system 106 can generate default prompts to determine the identity of a caller at caller device 102. These default prompts can be bypassed in accordance to rules 136. As such, if call processing system 106 implements voice recognition to identify a caller at caller device 102, then active call controller 115 can route inbound call 110 to, for example, a special features menu or to a voice mail menu while bypassing other default prompts. Alternatively, the call can go through directly to the called party, if the bypass rules 136 are configured to recognize a particular telephone number and/or other call attributes. This latter option can be particularly useful for example to have a called party call back a calling party, for example, in an emergency situation, possibly where a caller has dialed 911, or for a high priority return call. In one embodiment, a call from a first communication device is made to 911, passing through the call processing system 106, but the call does not go through to completion. The bypass rules 136 are configured to recognize when a call is being made from a 911 operator, in this case by recognizing the return caller's number, and thus to allow the 911 operator to call back the original caller without having to respond to default or other customized prompts. Instead, the 911 return call connects directly with the original caller. In a further embodiment, an active call that is either completed or not completed need not be disconnected, Instead, the active call can be put in waiting (i.e., "parked") at a media server 370 (FIG. 3) of the call processing system, while the called party calls the original calling party whose call remains active at the media server 370. For instance, the call from the party above who dialed 911 and was disconnected would not be disconnected in this embodiment. Rather, the call would wait at the media server 370 for the 911 operator to call back, and the return call would be bridged by the media server 370. In a further embodiment, the active call waiting at the media server 370 can be bridged not only to the original called party, but other parties also could join the bridged call.

Response 105 also can include commands that specifically enable a caller to bypass usual system prompts during an active call. A system administrator at computing device 150 or a user at callee device 108/caller device 102 can enable or disable the application of bypass rules 136 using any input device, including a web portal, a softphone client, any other client application, text messaging, or dual-tone multi-frequency (DTMF) inputs into a phone (DTMF commonly refers to keypad dial-tones). As such, active call controller 115 can provide a short, least-cost path while enabling a caller device 102 to access the functions of call processing system 106.

In various embodiments, notification controller 114 can generate notifications and can control how those notifications are delivered in accordance with the notification rules in repository 140. Repository 140 is shown to include alert notification rules 142, notification trigger rules 144, and notification delivery rules 146. A system administrator at computing device 150 or a user at callee device 108/caller device 102 can modify one or more of these rules. In one embodiment, a notification controller 114 can be configured to send an alert, such as a pager announcement (or any other type of alert), to a responsible entity, such as a company supervisor. Such a notification implies that a responsible entity should monitor inbound call 110. In this case, notification controller 114 can use alert notification rules 142. In another embodiment, notification controller 114 can use notification trigger rules 144 to determine whether to generate a notification. Triggering events include the existence of any of the following, as discussed above: an active call, a parked call, a missed inbound call 110, and recorded voicemail messages. In still another embodiment, notification controller 114 can use notification delivery rules 146 to determine how to deliver a notification. In one case, notification delivery rules 146 can specify the device or protocol by which to send a notification, such as via telephone, email, pager, HTML, MIME or any other messaging system or device. In another case, a user can enable no notifications, or the user can enable one or more notifications, which can be a function of a caller ID or message type. For example, if notification delivery rules 146 specify that a message type "parked call" should generate a notification, then notification controller 114 can do so. In still yet another case, consider that notification delivery rules 146 specify different delivery options based on whether a callee is present, such as at a computer, on a telephone, from an event calendar or other activity information prior to sending a notification. In response to these rules, notification controller 114 can modify the delivery of the notification to select an optimal process by which to find and notify the user. For example, notification delivery rules 146 might specify that a notification should be sent to a mobile phone first, a landline second and a pager third.

In one embodiment, notification controller 114 can apply both system-default and user-configured policies, as set forth in notification delivery rules 146, to deliver a notification to a user prior to the forwarding or transferring of a call to the user. Then, notification controller 114 can provide options to filter and screen callers prior to ringing, or before answering the forwarded or transferred call. In at least one embodiment, notification controller 114 can send notifications (e.g., periodically) until the user is determined to be present at callee device 108, for example. Or, notification controller 114 can send the notifications until either the user acknowledges the notification, or until the triggering event is removed. For example, when a parked or incoming call is answered, then the notification can cease. Or, the notification can stop when a corresponding voice mail is retrieved. A notification can be customized by a user to include preferred notification fields, such as the name of the caller, caller-ID, date and time of the call. The user can select a language in which to receive a notification. In other examples, notification rules 140 can default to business hours, or can be configured by a system administrator or a user to provide notifications during a defined schedule, thereby ignoring or to escalating notification during other schedules.

Note that network 104 can include packet networks and switched networks, as well as any other suitable communications network. For example, private and/or public internet and switching networks can be used, such as IP networks (including protocols TCP, UDP, HTTP, etc.) and switched networks (including public switched telephone networks ("PSTN") or the like, as well as cellular, short message service ("SMS") and other wireless networks.)

Figure 2:
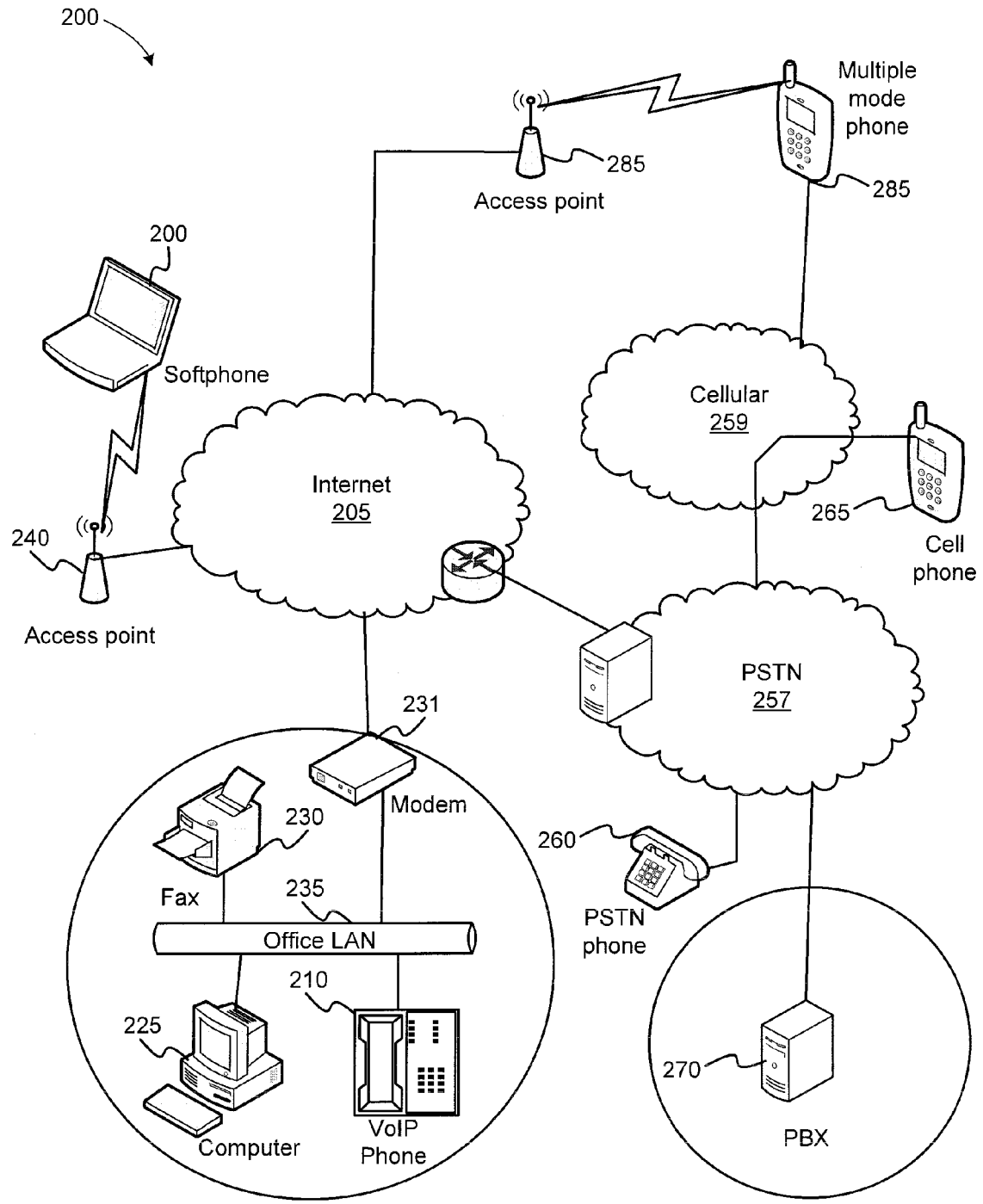
FIG. 2 is a diagram of a variety of endpoints that can interact with a call processing system, according to at least one embodiment of the invention.

FIG. 2 is a diagram 200 of a variety of endpoints that can interact with a call processing system, according to at least one embodiment of the invention. A call processing system can perform active call processing and notification when any of the following initiates a call: PSTN endpoints 260, enterprise PBX endpoints 270, Fax endpoints 230, cellular endpoints 265, multiple mode endpoint 280 and VoIP endpoints 210 and 220, and the like. Any of these endpoints can be configured to operate as caller device 102, callee device 108, or alternate callee device 109, as shown in FIG. 1. In at least some embodiments, multiple mode endpoint 280 can be a mobile computing device, such as a mobile communications device (e.g., a hand-held cellular phone), configured to access a cellular network 259 and a wireless network, such as a network configured to implement IEEE 802.11 technology (e.g., 802.11g, 802.11b, or the like).

Figure 3:
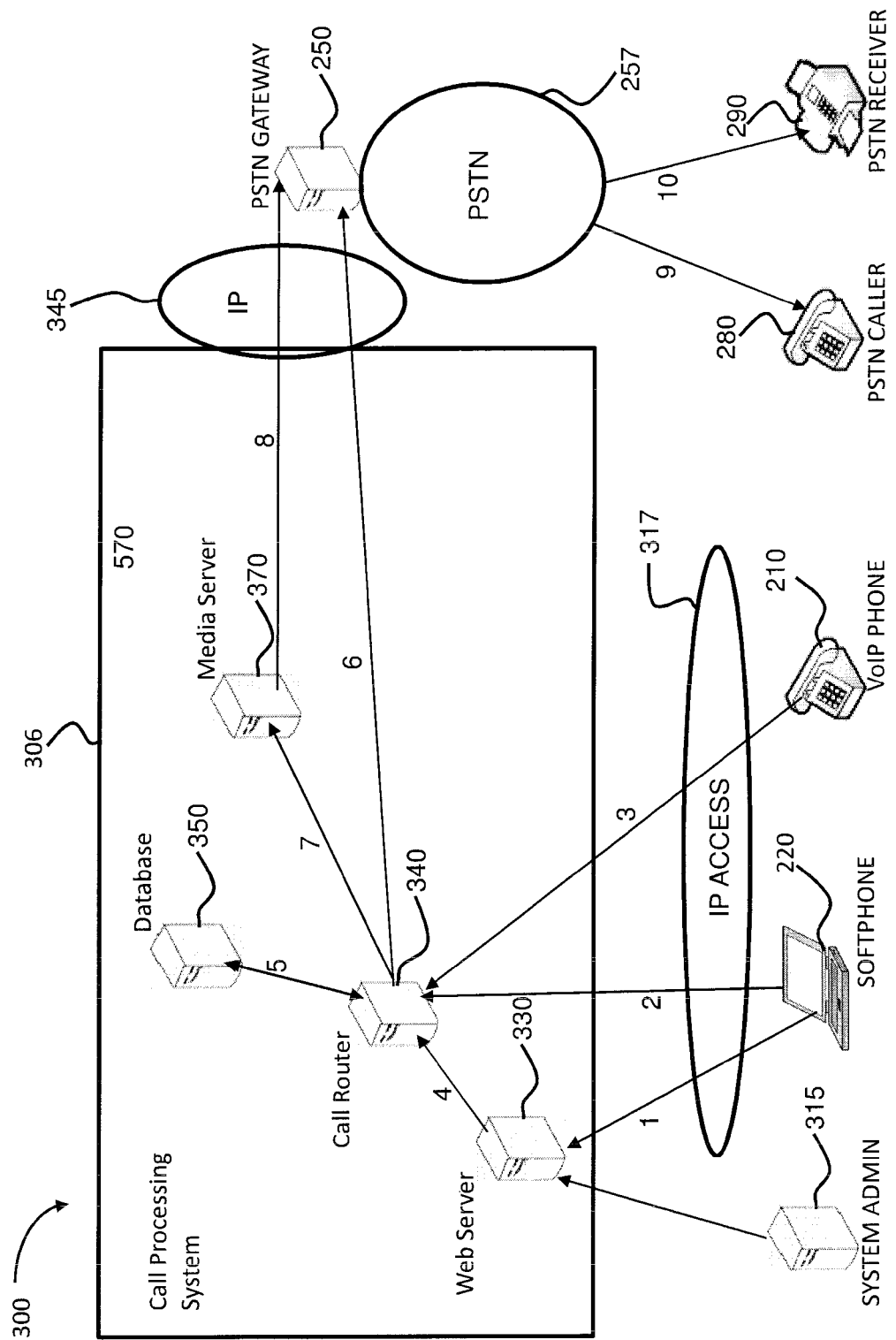
FIG. 3 is a diagram of a call processing system that is configured to process calls and notifications, according to at least one embodiment of the invention.

FIG. 3 is a diagram of a call processing system that is configured to process calls and notifications, according to at least one embodiment of the invention. Active call processing can be invoked by call endpoints 210, 280, 290, a web application hosted at web server 330, a software program ("softphone") 220 acting as an active call control agent, a media server 370, and/or a hosted call processing server 340, such as call router 340. Call processing system 306 can include call router 340, which can be a circuit switch or Internet softswitch configured to receive inbound calls from a first caller device 280, the same or another circuit call router 340 being configured to route the inbound call to a desired destination. For example, call router 340 can be configured to route an inbound call to media server 370 to play announcements to first caller device 280, or call router 340 can be configured to cause media server 370 to play announcements to another telephone, such as via a PSTN gateway 250 to one or more public switched telephone network devices 290. Call processing system 306 can include a Database 350 or any other storage mechanism for maintaining rules for filtering, announcing and routing an inbound call, and subsequent actions to: create routing rules, define customized auto-attendant menu options, generate notifications, and select a delivery process by which to deliver a notification. Networks 317 and 345 can be IP networks.

Call processing system 306 can also include one or more configuration tools including a Web Server 330 to configure the rules for filtering, announcing, routing and completing calls. A computing device 315—as a system administrator or an authorized user—can configure web server 330 to modify call action rules stored, for example, in repositories 120, 130, and 140 (FIG. 1). As such computing device 315 and/or web server 330 can maintain a Database 350 (or any other storage mechanism) for storing system administrator rules and/or end user defined rules. Examples of some tools that support inbound call processing and notification include client applications, such as contact management, appointment and calendar systems, any of which can be found in, for example, an email program.

Database 350 can store call history information for each inbound call, including active call identifiers (e.g., caller IDs) to receive call status and send active call commands. For example, database 350 can maintain data representing a first party calling-ID (ANI), a type of endpoint associated with the first calling party, such as a PSTN phone 280, a second destination endpoint DNIS, a result code (e.g., indicating a recipient status) if the call was connected or not connected, and the result of each prior call (e.g., whether the previous call history includes no answers to callee device 108 of FIG. 1). Database 350 can also be configured to retain customer credit information, satisfaction information, and other customer profile information associated with each inbound caller-ID. Database 350 also can store call transfer, conferencing, recording and customer feedback information.

Call processing system 306 can facilitate call processing with audio menu prompts stored in, for example, media server 370 and in accordance with a set of policies. Each inbound call can be identified using inbound caller-ID, caller name, stored contact and caller history information. When identified, the inbound call processing policies can be customized for a specific active call. Database 350 can store call recordings and audio menu options. Call Router 340 and Media Server 370 can access Database 350 for accessing rules to re-route calls (for example, to the media server 370 for recording or for other purposes, for example, to keep an active call active and waiting at the media server 370, awaiting a called party to respond/join the caller), and to dynamically create customer audio menus depending upon the detected call participants and the call context (such as "Press 1 to talk to have a private conversation with party 1, etc."). Each user or a system administrator at computing device 315 can allow or disallow a call to barge-in by interrupting an ongoing call to talk to one of the current call endpoints. As another option, as determined from the caller parameters and assigned priority, call processing system 306 can add a call to an existing conference call.

Figure 4:
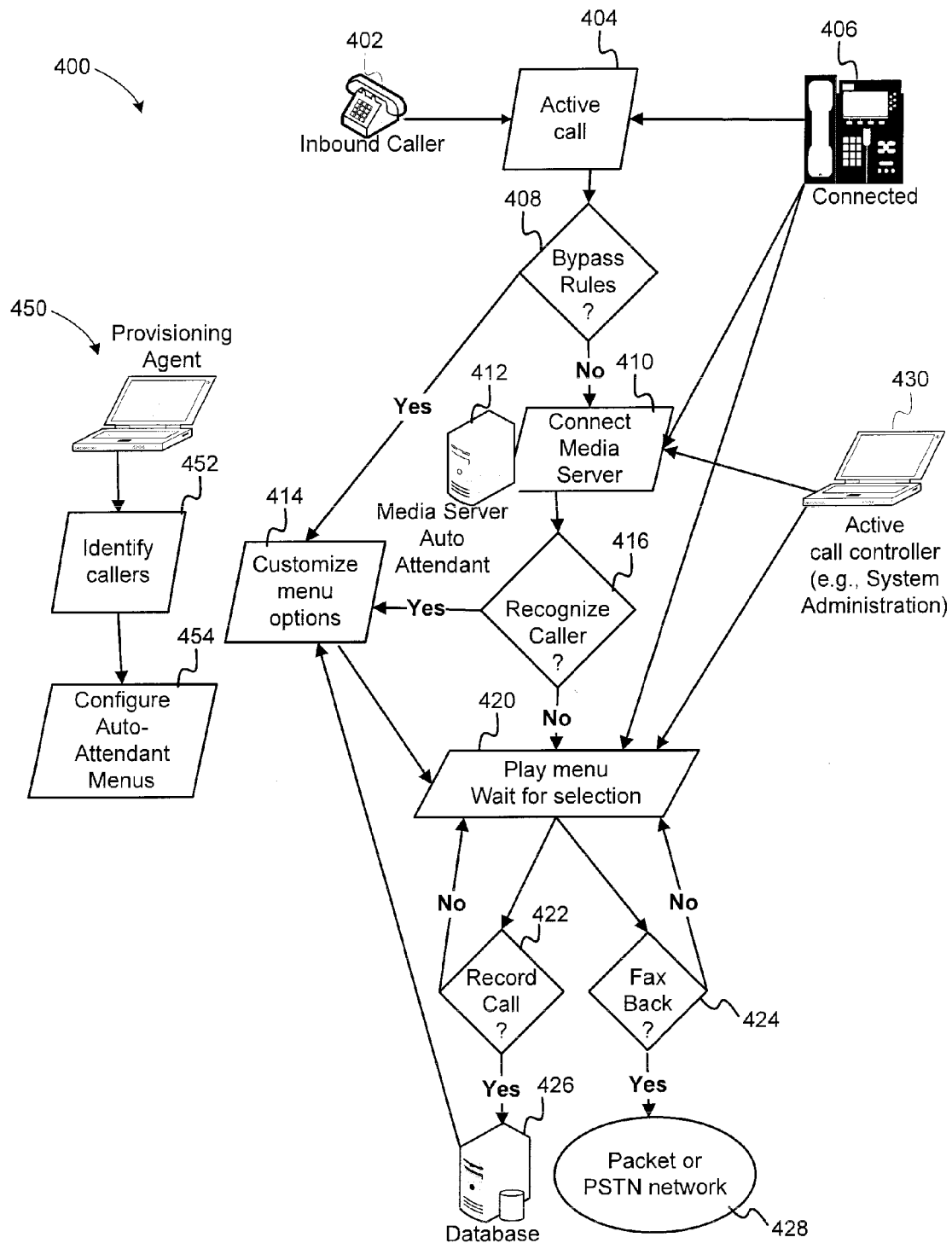
FIG. 4 is a flow diagram that is an example of a method of processing active calls, according to at least one embodiment of the invention.

FIG. 4 is flow diagram 400 that is an example of a method of processing active calls, according to at least one embodiment of the invention. The call processing system can be configured to facilitate an active call 404 between a caller device 402 and a callee device 406. At 408, the call processing system can determine whether to implement bypass rules to bypass default processes at 410, and optionally processes at 420. If yes, then flow 400 bypasses at least default processes at 410, thereby reducing time and steps and call media flow to a media player 412 (or a media server 370) to get and play back a menu of interest, such as a voice mail menu including customized menu options at 414. As such, flow 400 provides optionally for not connecting media server 370 to an active call. If no, then the flow continues from 408 to 410, at which media player 412 can provide for auto-attendant prompts to, for example, identify the caller at 416. If the caller is recognized, then flow 400 moves to a menu of interest at 414. But if not, then flow 400 moves to 420 at which a menu (e.g., a default menu) can be presented to a caller, and, in some embodiments, the same or a different menu can be presented to the callee. The callee can select at 422 to record a call into database 426 to continue flow 400. Or, a caller or a user can select a delivery mode at 424 to receive a response via alternate delivery mode other than during the call (e.g., such as sending a fax to the caller; i.e., "fax back" as a response), the response being transmitted via either a packet or a PSTN network 428. Note that active call controller 430 can provide for dynamic customization of menus and prompts, especially during active calls. Note, too, a provisioning agent 450 can identify callers at 452 and then configure an auto-attendant menu at 454.

FIG. 5 is a diagram 500 showing an example of an interface that can be implemented to configure the processing of calls, according to at least one embodiment of the invention. Here, interface 502 includes input fields to enter contact IDs (e.g., a name), associated phone numbers, email addresses, and the like, any of which can be associated with a caller ID. Here, notifications can be generated as either emails or text messages. The trigger events include the reception of a voice message at 510, a fax message at 512, an incoming call at 514, a missed call, or outbound fax confirmation 516 (e.g., in response to a recipient fax machine or the like signaling a successful fax transmission). Interface 502 can provide user inputs to select the delivery options for the notifications. For example, field 510a can specify whether to send a notification or not as, for example, an email. If so, field 510a optionally can accept user input specifying to include a message (e.g., a voice message) as an attachment. Field 510b optionally can accept a destination email address. Field 510c can accept an indication whether to provide a notification via text messaging. Field 510d optionally can accept a phone number (e.g., a mobile phone number) that is to receive a notification. In some embodiments, interface 502 includes fields 514a and 514b for respectively accepting indications whether to refrain from sending notifications if the caller leaves a message or if the callee answers the call.

Figure 6:
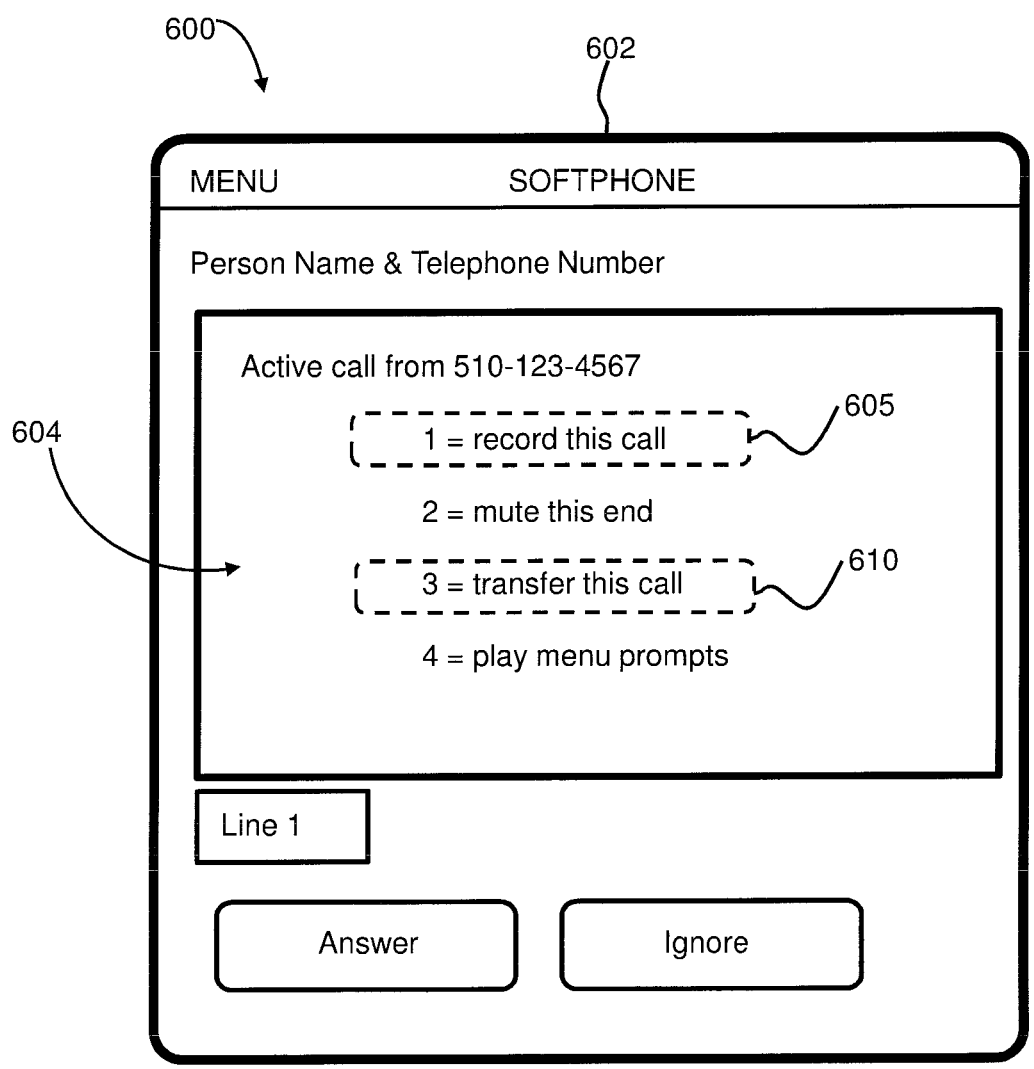
FIG. 6 is a diagram showing an example of an interface configured to facilitate active call processing at an endpoint, according to at least one embodiment of the invention.

FIG. 6 is a diagram 600 showing an example of an interface configured to facilitate active call processing at any third party agent that need not be connected to the active call media, according to at least one embodiment of the invention. Portion 604 of interface 602 presents a subset of commands that a user can use during an active call, whereby the subset of commands can be determined in accordance with a set of rules. These rules can be configured to alert potential call receivers, thereby enabling them to make decisions of what calls to answer, to redirect or to ignore. Selection option 605 can initiate recording of the call. According to at least one embodiment of the invention these rules are presented to a third party not necessarily connected to the active call media. Selection option 610, if selected, can transfer a call.

In at least some of the embodiments of the invention, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Figure 7A:
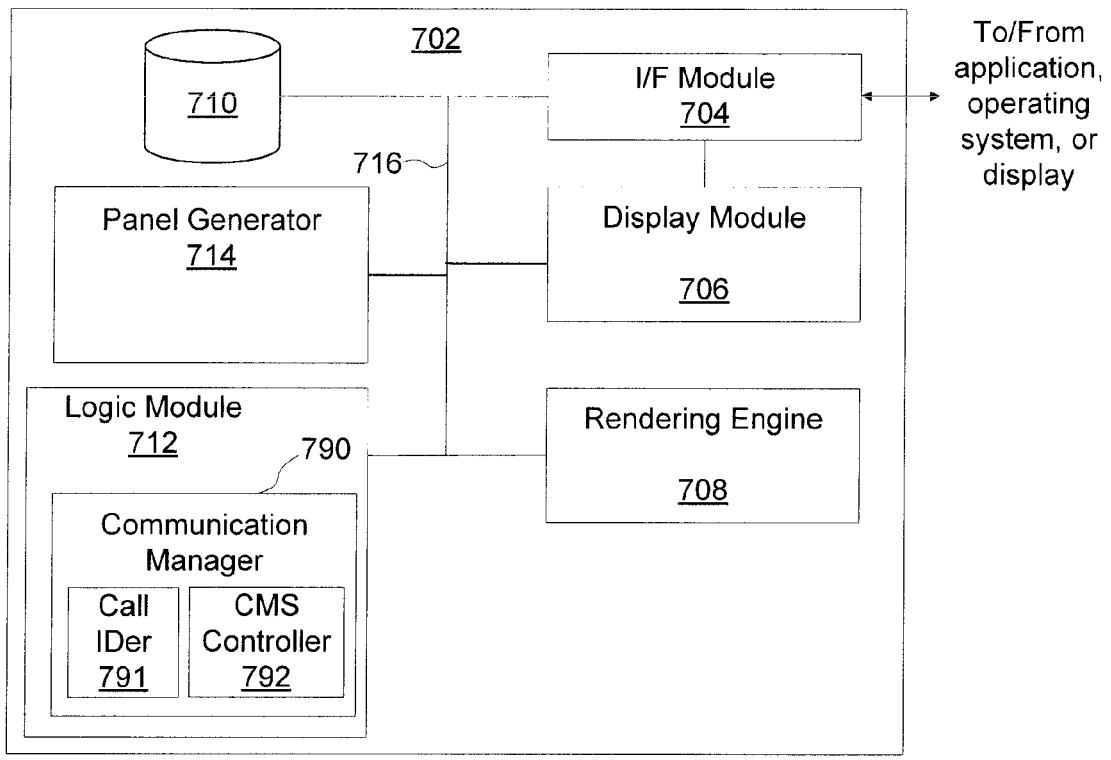
FIG. 7A illustrates an example of a panel presentation application for active call processing and notification generation, according to various embodiments of the invention.

FIG. 7A illustrates an example of a panel presentation application for active call processing and notification generation, according to various embodiments of the invention. In at least one embodiment, an interface to provide for active call processing and notification generation can be implemented in a panel, such as a single panel, in one or more portions thereof, or in separate panels. Application 702 can be a softphone application (e.g., an application configured to adapt a computing device to perform known telephony functions), or an application disposed on a server, such as web server 330 (FIG. 3), to carry out the active call processing and/or notification generation functionalities described herein. Here, application 702 includes interface ("I/F") module 704, display module 706, rendering engine 708, repository 710, logic module 712, panel generator 714, and data bus 716. In some examples, the number and type of elements shown and described may be varied and are not limited to the descriptions provided. In some examples, the above-described elements can be implemented as part, component, or module of application 702. As an example, application 702 can be implemented to include either commands for establishing rules to effect active call processing and notification generation, as well as effecting communication among endpoints, the commands imparting functionalities as described herein. Logic module 712 can be implemented as software, hardware, circuitry, or a combination thereof to implement control logic for the described techniques for panel presentation. As used herein, the term "panel," at least in one embodiment, can refer to displays, palettes, tabs, windows, screens, portions of an interface, and the like.

In some examples, logic module 712 can be configured to control panel generator 714 to form a call management system configured to present active call processing and notification generation options to, for example, provide for customizable active call control and notification of calls. Rendering engine 708 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 706 (FIG. 7). Interface module 704 can exchange panel presentation data, including content data, image data, audio data, as well as other data, between application 702 and another application (e.g., a host, client, web services-based, distributed (i.e., enterprise), application programming interface ("API"), operating system, program, procedure or others) that can use data and information generated from panel generator 714 to render presented panels on a display screen. In other examples, the above-described techniques and elements can be varied in design, implementation, and function and are not limited to the descriptions provided. In one embodiment, logic module 712 can include call processing module 790 that is configured to include structure and/or functionality similar to one or more previously-described communication call processing systems and/or components thereof. For example, logic module 712 can also include an active call controller ("AC Cont") module 791 and a notification ("Notif") controller module 792, both of which can be configured to be accessed via an interface. For example, active call controller module 791 can be configured to control aspects of an active call, and notification controller module 792 configured to detect triggering events that generate a notification, and to select a mode of delivery for the notification.

Figure 7B:
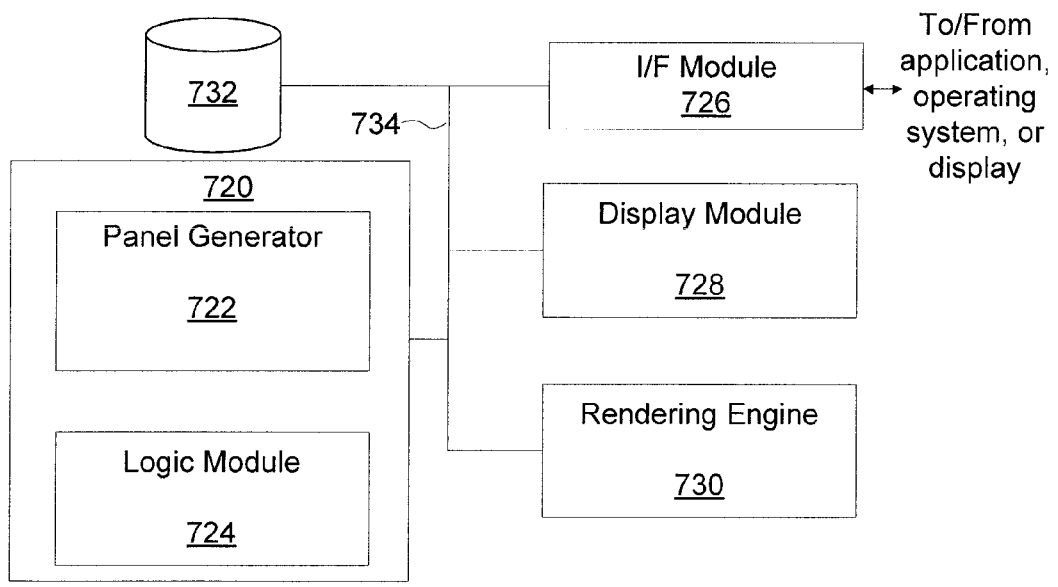
FIG. 7B illustrates an alternative example of a panel presentation application for implementing an interface to provide for active call processing and notification generation, according to one embodiment of the invention.

FIG. 7B illustrates an alternative example of a panel presentation application for implementing an interface to provide for active call processing and notification generation, according to one embodiment of the invention. Here, application 720 includes panel generator 722 and logic module 724, which can have equivalent functionality as 712 of FIG. 7A. Further, application 720 is shown in data communication with interface ("I/F") module 726, display module 728, rendering engine 730, and repository 732. Data bus 734 can be configured to send or receive data among application 720, I/F module 726, display module 728, rendering engine 730, and repository 732. In other examples, more, fewer or different elements can be used and implemented without limitation to the examples provided above.

In some examples, logic module 724 and panel generator 722 can be implemented as part of application 720, which can be implemented separately from other functional components or modules, such as interface module 726, display module 728, rendering module 730, and repository 732. Data bus 734 can be implemented to communicate data over a given port between application 720 and interface module 726, display module 728, rendering module 730, and repository 732. In some instances, application 720 can be implemented as a standalone application or as a component (i.e., module) of another application. Data or information (e.g., content or file data including data representing media files, auto-attendant policies, notification rules, and the like) associated with a panel can be stored in repository 732, which can be implemented using a database, data store, data warehouse, or any other type of data repository or structure. In other examples, more, fewer, or different modules can be used to implement the described techniques for panel presentation and are not limited to those provided.

Figure 8A:
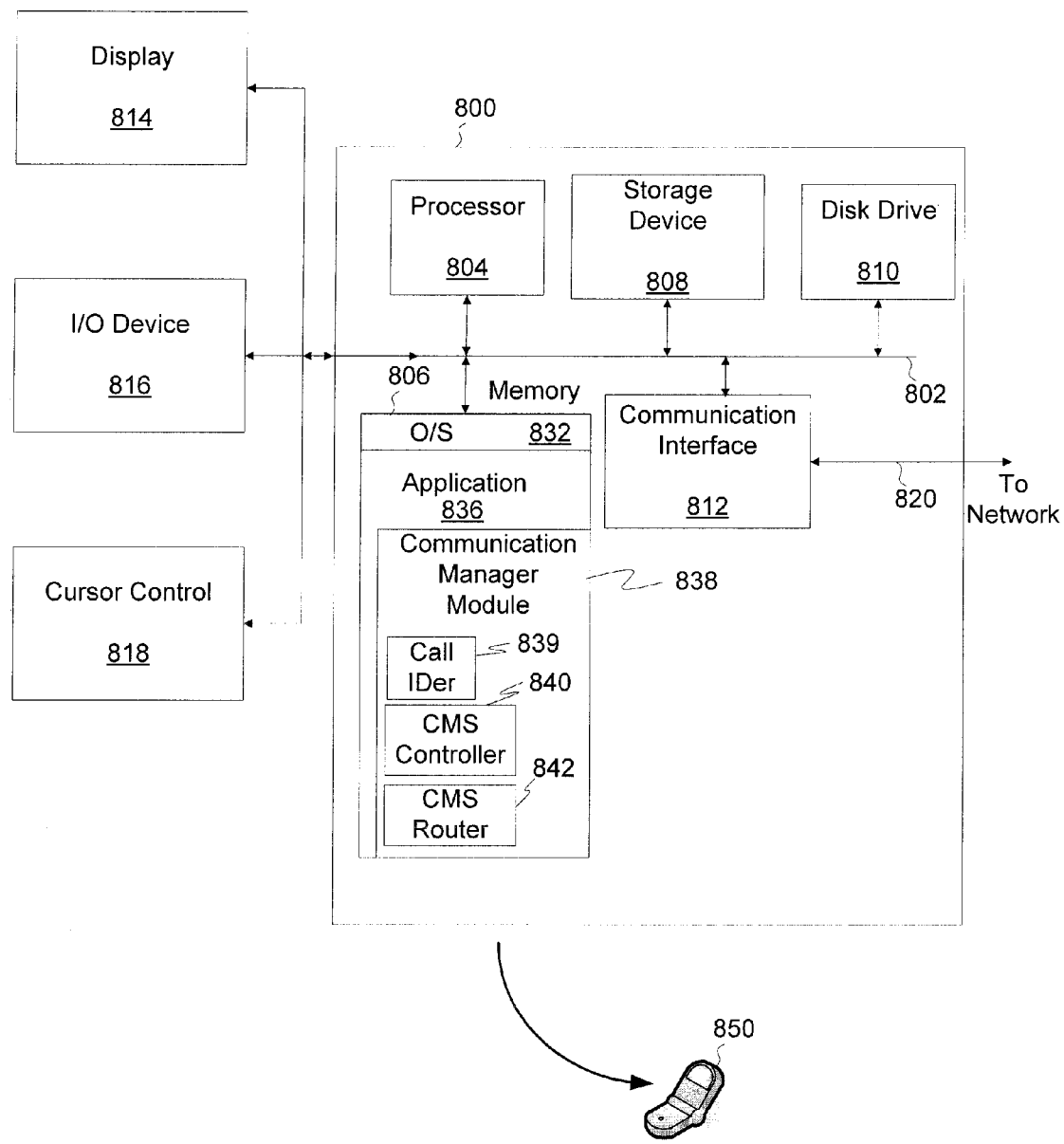
FIG. 8A illustrates an exemplary computer system suitable for active call processing and notification generation, according to at least one embodiment of the invention.

FIG. 8A illustrates an exemplary computer system suitable for active call processing and notification generation, according to at least one embodiment of the invention. In some examples, computer system 800 can be used to implement computer programs, applications, methods, processes, or other software to perform the above-described techniques and to realize the structures described herein. Computer system 800 includes a bus 802 or other communication mechanism for communicating information, which interconnects subsystems and devices, such as one or more processors 804, system memory ("memory") 806, storage device 808 (e.g., ROM), disk drive 810 (e.g., magnetic or optical), communication interface 812 (e.g., a modem, Ethernet card, or any other interface configured to exchange data with a communications network), display 814 (e.g., CRT or LCD), input device 816 (e.g., keyboard), and pointer cursor control 818 (e.g., mouse or trackball). In one embodiment, pointer cursor control 818 invokes one or more specialized commands that can facilitate call processing as well as generating and receiving notifications. Pointer cursor control 818 can interact via a pointer cursor with interfaces for a call processing system to process active calls and generate notifications.

According to some examples, computer system 800 performs specific operations in which processor 804 executes one or more sequences of one or more instructions stored in system memory 806. Such instructions can be read into system memory 806 from another computer readable medium, such as static storage device 808 or disk drive 810. In some examples, hard-wired circuitry can be used in place of or in combination with software instructions for implementation. In the example shown, system memory 806 includes modules of executable instructions for implementing an operation system ("O/S") 832, an application 836, and a call processing module 838, which, in turn, can implement an active call controller ("AC Controller") module 840, and a notification controller module 842 to provide the functionalities described herein.

The terms "computer readable medium" and "computer readable media" refer, at least in one embodiment, to any medium that participates in providing instructions to processor 804 for execution. Such a medium or media can take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of electromagnetic, acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 800. According to some examples, two or more computer systems 800 coupled by communication link 820 (e.g., links to LAN, PSTN, or wireless network) can perform the sequence of instructions in coordination with one another. Computer system 800 can transmit and receive messages, data, and instructions, including program code (i.e., application code) through communication link 820 and communication interface 812. Received program code can be executed by processor 804 as it is received, and/or stored in disk drive 810, or other non-volatile storage for later execution. In one embodiment, system 800 (or a portion thereof) can be implemented as a hand-held device, such as a mobile phone 850. But in other embodiments, system 800 can be implemented as a personal computer (i.e., a desk top computer) or any other computing device.

FIG. 8B illustrates another exemplary computer system suitable for process active calls and generate notifications, according to at least one embodiment of the invention. In some examples, computer system 880 can be used to implement computer programs, applications, methods, processes, or other software to perform the above-described techniques and to realize the structures described herein. According to at least some embodiments, computer system 880 can include similar or equivalent functionalities and/or structures as computer system 800 of FIG. 8A. As shown in FIG. 8B, computer system 880 includes multiple communication interfaces 812a and 812b, and others not shown (e.g., a radio receiver to receive global positioning signals ("GPS")). In at least some embodiments, communication interface 812a can provide a communication link 820a to a network ("1") one, such as digital cellular network, and communication interface 812b can provide a communication link 820b to a network ("2") two, such as an IP network.

In the example shown, system memory 806 can include modules of executable instructions for implementing a call processing system ("CPS") transceiver module 860 that is configured to communicate with call processing systems described herein. Further, system memory 806 can include an out-of-band communication module 862 that is configured to convey notifications and/or menu options (e.g., to record the call, transfer the call and generate a notification, play menu prompts, etc.) regarding a call with a caller device (e.g., caller device 102 of FIG. 1). In one embodiment, system 880 (or a portion thereof) can be implemented as a hand-held device, such as a mobile phone 850. But in other embodiments, system 880 can be implemented as a personal computer (i.e., a desk top computer) or any other computing device. To illustrate operation, consider that system 880 can be implemented in a mobile phone 880 as a caller device as described herein. Thus, system 880 can use out-of-band communication module 862 to receive and transmit data relating to notifications and/or menu options, and use digital transmission cellular circuitry (e.g. communication interface 812b), to transmit active call data and notification data of system 850 along with or separate from (e.g., in parallel or in series) call data sent over any of the multiple networks, including IP and digital cellular networks.

Figure 9:
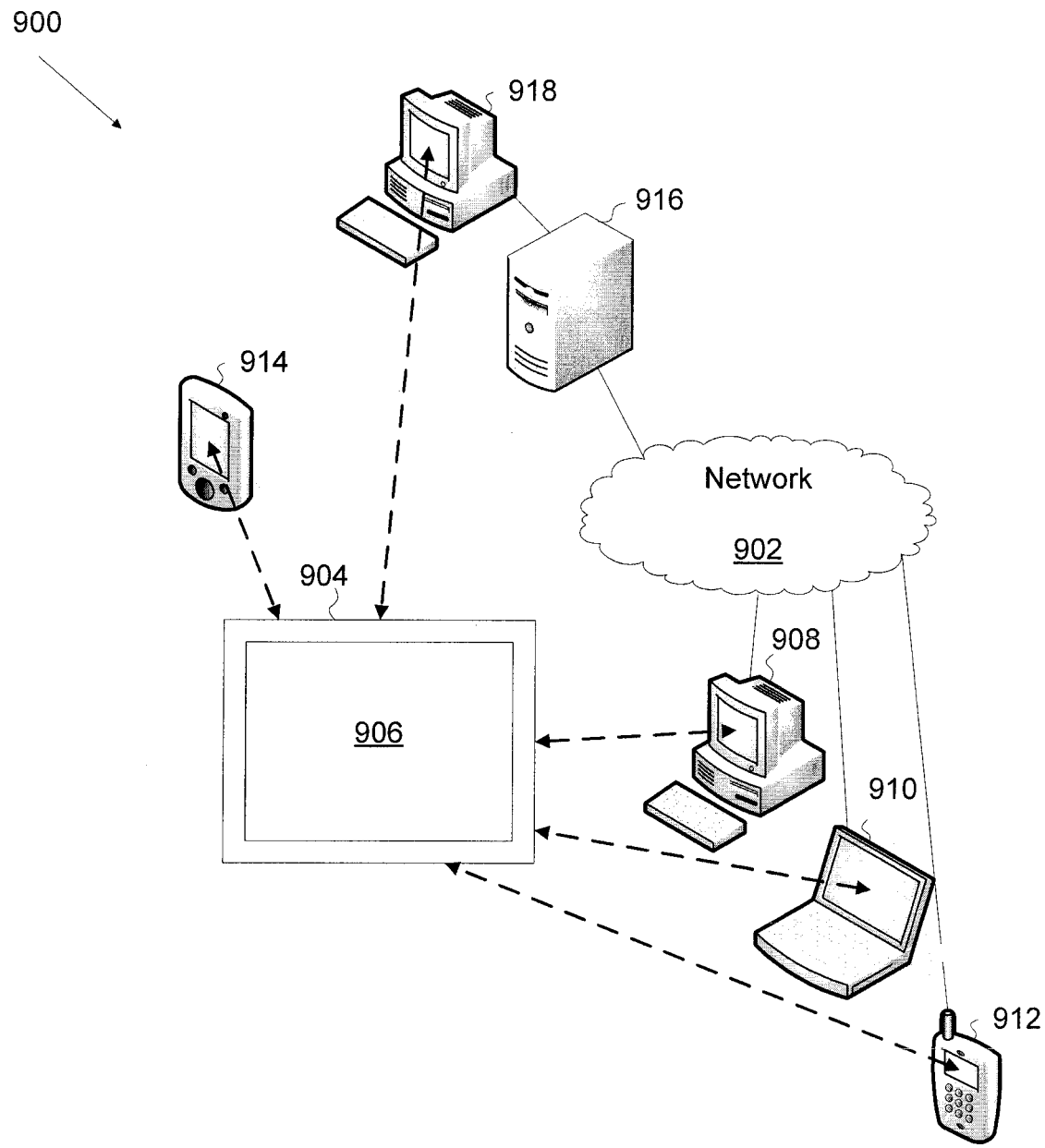
FIG. 9 illustrates an example of an interface for facilitating active call processing and notification generation as well as communicating with endpoints via the interface, according to various embodiment of the invention.

FIG. 9 illustrates an example of an interface for facilitating active call processing and notification generation as well as communicating with endpoints via the interface, according to various embodiment of the invention. Here, system 900 includes network 902, display environment 904, interface 906, which can be presented on devices such as computer 908, notebook computer ("notebook" or "laptop") 910, smart phone 912, personal digital assistant ("PDA") 914, server 916, and administrator computer 918. In other examples, the number and type of devices can be varied and are not limited to those shown and described.

In some examples, one or more panels for inbound call management and/or call communication (e.g., using interface 906 for connecting calls, sending electronic messages, etc.) can be presented on interface 906, which can be an interface for an application, such as a video and audio editing application, or as a web browsing program, Internet content portal, client or desktop application for any purpose. Panels can be used to provide additional or supplemental information that can be contextually relevant to another panel presented in interface 906. Computer 908, notebook computer ("notebook" or "laptop") 910, smart phone 912, personal digital assistant ("PDA") 914, server 916, and administrator computer 918 can provide content data for rendering content as well as other data, which can be implemented to generate, for example, user inputs configured to accept data to modify call routing and to answer and make phone calls. In some cases, an operating system installed on computer 908 can communicate (i.e., via an application programming interface ("API")) content data and/or other related data to another application installed on computer 908 to render (i.e., interpreting data and information to draw or display the content in an interface) one or more panels presented in interface 906. In some examples, different types of panels can be rendered in interface 906. In one embodiment, interface 906 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 7A to 9, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A system for processing calls, comprising:
a call processing system configured to communicate with a caller device and with at least one callee device over a communications network, the call processing system comprising an active call controller,
the active call controller configured to control a plurality of aspects of an inbound call as an active call from the caller device;
a notification controller configured to detect one or more triggering events including the inbound call via the call processing system from the caller device to the callee device and any of a parked call, a missed inbound call, and recorded voicemail messages, and further configured to select a mode of delivery with which to transmit a notification of the inbound call, parked call, missed inbound call, or recorded voicemail messages from the call processing system to a mobile device, the mode of delivery including short message service ("SMS") for transmission to the mobile device; and
a switch configured to route the inbound call from the caller device to the callee device after implementation of a set of bypass rules stored in a repository of the call processing system, the bypass rules configured to be implemented where the caller device, in response to a missed call from the callee device, calls back the callee device within a predetermined period of time after the missed call from the callee device,
wherein the missed call from the callee device was previously routed by the call processing system, and
wherein the bypass rules allow the caller device to avoid a set of default prompts when the caller device calls back the callee device.

2. The system as in claim 1, wherein the predetermined period of time is defined by a user of the call processing system.

3. A method for processing an active inbound call, the method comprising:
determining whether to implement a set of bypass rules for handling the active inbound call, wherein the active inbound call is made from a caller device in response to a missed call from a callee device within a predetermined period of time after the missed call from the callee device;
wherein the missed call from the callee device was previously routed by the call processing system;
detecting one or more triggering events including the active inbound call and any of a parked call, a missed inbound call, and recorded voicemail messages via a call processing system from the caller device to the callee device;
selecting a mode of delivery with which to transmit a notification of the active inbound call or the parked call, a missed inbound call, or recorded voicemail messages from the call processing system to a mobile device, the mode of delivery including short message service ("SMS") for transmission to the mobile device;
bypassing a set of default screening processes for handling the active inbound call; and connecting the active inbound call.

4. The method of claim 3 further comprising, before the determining step:
making the active inbound call within the predetermined period of time of the missed call, the predetermined period of time configured by a user at the callee device.

5. The method of claim 3, further comprising:
refraining from transmitting the notification if a caller leaves a message.

6. The method of claim 3, further comprising:
refraining from transmitting the notification if a callee answers the inbound call.

7. The method of claim 3, further comprising identifying the caller by voice recognition or by calling telephone number and performing the bypassing when the caller is recognized using the voice recognition or by calling telephone number.

8. The method of claim 3 further comprising selecting the notification from among a plurality of notifications that have been enabled as a function of message type.

9. The method of claim 3 further comprising selecting the notification for transmission to a responsible entity.

10. Non-transitory computer readable media comprising executable instructions to:
detect at a call processing system an inbound call from a caller device to a callee device;
detect one or more triggering events including the inbound call and any of a parked call, a missed inbound call, and recorded voicemail messages via the call processing system from the caller device to the callee device;
select a mode of delivery with which to transmit a notification of the inbound call or the parked call, a missed inbound call, or recorded voicemail messages from the call processing system to a mobile device, the mode of delivery configured to transmit the notification to the mobile device;
determine whether the inbound call is subject to a set of bypass rules when the caller device calls back the callee device in response to a missed call from the callee device within a predetermined period of time after the missed call from the callee device;
wherein the missed call from the callee device to the caller device was previously routed by the call processing system; and
bypass a set of default prompts to the caller device when the caller device calls back the callee device.

11. The non-transitory computer readable media of claim 10, wherein the executable instructions to determine whether the call is subject to the bypass rules further comprise executable instructions to:
   determine whether the inbound call occurs within the predetermined period of time after the missed call from the callee device.

12. The non-transitory computer readable media of claim 11 further comprising executable instructions to:
   connect the call to a second communication device, responsive to the inbound call occurring within the predetermined period of time.

13. The non-transitory computer readable media of claim 10, wherein the executable instructions further comprise executable instructions to:
   determine an identity of a caller at the caller device; and
   transmit data representing the identity of the caller to the callee device.

14. The non-transitory computer readable media of claim 10, wherein the executable instructions to select the mode of delivery further comprise executable instructions to:
   transmit the notification via email to the mobile device.

* * * * *